US011636250B2

(12) United States Patent
McGinnis

(10) Patent No.: US 11,636,250 B2
(45) Date of Patent: *Apr. 25, 2023

(54) METHODS, SYSTEMS, AND APPARATUS FOR TEXT MESSAGE TO PERSISTENT MESSAGING

(71) Applicant: illumy inc., San Ramon, CA (US)

(72) Inventor: Matthew Kent McGinnis, San Ramon, CA (US)

(73) Assignee: illumy inc., San Ramon, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/480,175

(22) Filed: Sep. 21, 2021

(65) Prior Publication Data
US 2022/0004695 A1    Jan. 6, 2022

Related U.S. Application Data

(60) Continuation of application No. 17/448,174, filed on Sep. 20, 2021, which is a division of application No.
(Continued)

(51) Int. Cl.
*G06F 3/0484* (2022.01)
*G06F 40/103* (2020.01)
(Continued)

(52) U.S. Cl.
CPC ........ *G06F 40/103* (2020.01); *G06F 3/04847* (2013.01); *G06F 40/205* (2020.01); *H04L 51/42* (2022.05)

(58) Field of Classification Search
CPC ......... H04L 51/42; H04L 51/22; H04L 51/04; H04L 51/08; G06F 40/103; G06F 40/205;
(Continued)

(56) References Cited

U.S. PATENT DOCUMENTS 6,553,341 B1   4/2003   Mullaly et al.
7,925,635 B1   4/2011   Ravulur et al.
(Continued)

FOREIGN PATENT DOCUMENTS

AU   2007217789 A1   8/2007
AU   2013200529 B2   2/2016
(Continued)

OTHER PUBLICATIONS

Non-Final Office Action In U.S. Appl. No. 16/695,721 dated Oct. 18, 2022, 37 pages.
(Continued)

*Primary Examiner* — Steven P Sax
(74) *Attorney, Agent, or Firm* — Smith Baluch LLP

(57) ABSTRACT

A chat-based persistent messaging platform that can seamlessly convert messages from different modalities (e.g., email clients and text message clients) into persistent messages and vice versa is described herein. The platform can include a parsing processor to convert messages into standard format data. A message classifier can process the standard format data into different subcomponents. These subcomponents can be translated into persistent messaging content via one or more content processing engines. The persistent messaging content can be converted into a persistent message via the parsing processor. The message classifier can also add messages into a persistent thread so that message history between two or more users can be maintained in perpetuity.

20 Claims, 10 Drawing Sheets

Related U.S. Application Data

16/617,099, filed as application No. PCT/US2019/061174 on Nov. 13, 2019, now Pat. No. 11,126,784.

(60) Provisional application No. 62/816,417, filed on Mar. 11, 2019, provisional application No. 62/760,885, filed on Nov. 13, 2018.

(51) Int. Cl.
*G06F 40/205* (2020.01)
*G06F 3/04847* (2022.01)
*H04L 51/42* (2022.01)

(58) Field of Classification Search
CPC .. G06F 3/04847; G06F 3/0488; G06F 3/0481; G06F 3/0482; G06F 3/0484; G06F 15/16; G06F 17/212; G06F 3/04855; G06Q 10/107; G06Q 10/103
See application file for complete search history.

(56) References Cited

U.S. PATENT DOCUMENTS

| | | | |
|---|---|---|---|
| 8,412,782 B2 | 4/2013 | Chi et al. | |
| 8,521,823 B1 | 8/2013 | Sheinberg et al. | |
| 8,583,743 B1 | 11/2013 | Gailloux et al. | |
| 8,775,520 B1 | 7/2014 | Lewis et al. | |
| 8,799,375 B1 | 8/2014 | Aharoni | |
| 8,875,029 B1 | 10/2014 | Naidu | |
| 9,141,823 B2 | 9/2015 | Dawson | |
| 9,177,293 B1 | 11/2015 | Gagnon et al. | |
| 9,350,692 B1 | 5/2016 | As et al. | |
| 10,126,927 B1 | 11/2018 | Fieldman | |
| 10,423,699 B1* | 9/2019 | Sartor | G06F 40/106 |
| 11,050,875 B1* | 6/2021 | Shetty | G10L 15/1815 |
| 11,088,973 B2* | 8/2021 | Alsina | G06F 16/48 |
| 11,126,784 B2 | 9/2021 | McGinnis | |
| 11,239,999 B1 | 2/2022 | Winarski | |
| 2003/0105827 A1 | 6/2003 | Tan et al. | |
| 2004/0137884 A1 | 7/2004 | Engstrom et al. | |
| 2006/0098650 A1 | 5/2006 | Beninato et al. | |
| 2007/0156817 A1 | 7/2007 | Daffner et al. | |
| 2008/0122796 A1 | 5/2008 | Jobs et al. | |
| 2008/0187004 A1 | 8/2008 | Johnson | |
| 2010/0030905 A1 | 2/2010 | Fikouras et al. | |
| 2010/0185665 A1 | 7/2010 | Horn et al. | |
| 2011/0307562 A1* | 12/2011 | Chakra | G06Q 10/107 709/206 |
| 2013/0007152 A1 | 1/2013 | Alspector et al. | |
| 2014/0006578 A1 | 1/2014 | Kohn et al. | |
| 2014/0025756 A1 | 1/2014 | Kamens | |
| 2014/0143358 A1 | 5/2014 | Beausoleil et al. | |
| 2015/0072651 A1 | 3/2015 | Ruttenbur | |
| 2015/0229531 A1 | 8/2015 | O'Sullivan et al. | |
| 2015/0312176 A1 | 10/2015 | Jones et al. | |
| 2015/0339373 A1* | 11/2015 | Carlson | H04L 51/04 707/737 |
| 2016/0269336 A1 | 9/2016 | Blinder et al. | |
| 2016/0314504 A1* | 10/2016 | Clark | H04L 51/52 |
| 2016/0315884 A1* | 10/2016 | Clark | H04L 51/216 |
| 2016/0315901 A1* | 10/2016 | Clark | G06F 9/44526 |
| 2017/0155748 A1 | 6/2017 | Cao | |
| 2017/0279761 A1 | 9/2017 | Eidelson et al. | |
| 2018/0144097 A1 | 5/2018 | Moore | |
| 2018/0217848 A1 | 8/2018 | Garai et al. | |
| 2018/0219810 A1 | 8/2018 | Santos Ramirez et al. | |
| 2018/0367484 A1* | 12/2018 | Rodriguez | H04L 67/75 |
| 2019/0050909 A1 | 2/2019 | Maynard | H04L 51/02 |
| 2019/0081914 A1* | 3/2019 | Chang | G06F 40/30 |
| 2020/0053206 A1* | 2/2020 | Kats | H04M 1/72439 |
| 2020/0153781 A1 | 5/2020 | McGinnis | |
| 2020/0267514 A1 | 8/2020 | Kim et al. | |
| 2021/0064643 A1* | 3/2021 | Folland | G06F 40/35 |

FOREIGN PATENT DOCUMENTS

| | | | | |
|---|---|---|---|---|
| CA | 2742697 A1 | | 8/2012 | |
| CA | 3068790 A1 * | | 1/2019 | H04L 51/046 |
| CA | 3057925 A1 | | 4/2020 | |
| CN | 101194277 A * | | 6/2008 | G06F 16/24 |
| CN | 104063369 A * | | 9/2014 | |
| CN | 107465797 B * | | 11/2020 | H04M 1/575 |
| EP | 2731320 A2 * | | 5/2014 | G06F 3/017 |
| EP | 2824873 A1 | | 1/2015 | |
| FR | 3016459 A1 | | 7/2015 | |
| JP | 3864251 B2 | | 12/2006 | |
| JP | 2016502806 A | | 1/2016 | |
| JP | 2019149182 A | | 9/2019 | |
| KR | 102329768 B1 * | | 11/2021 | |
| KR | 102330790 B1 * | | 11/2021 | |
| SG | 10201501549x | | 4/2015 | |
| TW | I724517 B * | | 4/2021 | |
| WO | 2016148814 A1 | | 9/2016 | |
| WO | 2018071594 A1 | | 4/2018 | |

OTHER PUBLICATIONS

Notice of Allowance in U.S. Appl. No. 17/480,175 dated Nov. 3, 2022, 10 pages.
International Search Report and Written Opinion in International Patent Application No. PCT/US2019/061174 dated Jan. 29, 2020, 20 pages.
Non-final Office Action in U.S. Appl. No. 16/695,721 dated May 18, 2021, 24 pages.

* cited by examiner

METHODS, SYSTEMS, AND APPARATUS FOR TEXT MESSAGE TO PERSISTENT MESSAGING

CROSS-REFERENCE TO RELATED APPLICATIONS

This application a continuation of U.S. application Ser. No. 17/448,174, entitled "Methods, Systems, and Apparatus for Email to Persistent Messaging," which was filed on Sep. 20, 2021, and which is a divisional of U.S. application Ser. No. 16/617,099, entitled "Methods, Systems, and Apparatus for Email to Persistent Messaging," which was filed on Nov. 26, 2019, and which in turn is a U.S. National Stage Application under 35 U.S.C. § 371 of International Application No. PCT/US2019/061174, entitled "Methods, systems, and apparatus for email and/or text to persistent messaging," which was filed on Nov. 13, 2019.

International application no. PCT/US2019/061174 claims the priority benefit, under 35 U.S.C. § 119(e), of U.S. Application No. 62/816,417, entitled "Methods, Systems, and Apparatus for Text to Persistent Messaging," filed on Mar. 11, 2019, and of U.S. Application No. 62/760,885, entitled "Methods, Systems, and Apparatus for Email to Persistent Messaging," filed on Nov. 13, 2018.

Each of these applications are incorporated herein by reference in its entirety.

BACKGROUND

As the world becomes more application-driven through the proliferation of general-purpose compute within desktop computers, laptop computers, mobile smartphones, tablets, and wearables, there has been an application explosion with the types of services provided by a collection of different unique and downloadable apps. In the communications space, there is email, Short Message Service (SMS), Multimedia Messaging Service (MMS), mobile messaging, instant messaging, team messaging, voice chat, voice calling, video calling, screen sharing, and more. This explosion has led to a fragmentation in how people stay connected and how they communicate both personally and professionally. With this application explosion combined with legacy analog and digital methods of communicating (e.g., plain old telephone service (POTS), radio, etc.), there is an overabundance of communication modalities competing for our time and attention. People are breaking away from traditional standards and forming islands of non-standard communication, many times not offering or allowing a ubiquitous means of connecting and interacting with friends, family, and co-workers.

SUMMARY

Today with the power of public cloud technologies and the separation of the application layer from the network layer (e.g., Internet Protocol (IP) based communications and services that ride on top of broadband network services, also known as Over The Top (OTT)), persistent communications is becoming a new way for people to converge communication modalities to allow a combination of textual, vocal, and visual communications into a single seamless conversational communications and productivity experience.

Persistent messaging can combine email and messaging together into a single ubiquitous experience. This can allow the 5.2 billion email addresses that originate over 281 billion emails per day to upgrade their user experiences to a rich and immersive multimedia communications experience that is available through modern consumer mobile and desktop devices. The systems, apparatus, and methods disclosed herein can connect the legacy email environment to a persistent messaging environment and can translate off-net email communications into on-net persistent messaging communications and vice versa.

The problems with email today are numerous. Spam, malware, limited attachment sizes, minimal support for embedded media (e.g., video real-time streaming), loss of time scale context, and more are making email more antiquated and less compatible with today's increasingly mobile world. With smart devices including high-definition color touch screens, rich audio, interactive cameras, and hardware enhancements, along with high-speed broadband connections, there is an unmet need for an efficient and capable system that can deliver a modern messaging experience that is well beyond email.

The problems with text messaging services today are also numerous. Limits to the number of characters a user can send per message, lack of file attachments, minimal support for embedded media (e.g., video real-time streaming), expensive international messaging rates, spam, malware, and more are making text messaging more antiquated and less compatible with the way people communicate today. With smart devices including high-definition color touch screens, rich audio, interactive cameras, and hardware enhancements, along with high-speed broadband connections, there is an unmet need for an efficient and capable system that can deliver a modern messaging experience that is well beyond text messaging.

The systems, apparatus, and methods disclosed herein modernize email by providing a conversational threaded messaging user interface and can translate emails into a persistent messaging environment. In some embodiments, a conversational threaded messaging approach uses a conversational approach in which all messages between people and/or groups are organized together. In some embodiments, the messages are organized in a context dependent manner. The systems, apparatus, and methods disclosed herein can include a translation engine that can parse, route, classify, process, and parse again to convert an email into a persistent message. The disclosed systems, apparatus, and methods can also convert a persistent message into an email. This function seamlessly allows the modern mobile environment to be forward and backward compatible with the email market.

Similarly, the systems, apparatus, and methods disclosed herein can connect legacy text messaging environment to a persistent messaging environment and can translate off-net text messaging communications into on-net persistent messaging communications and vice versa.

A method for translating an email from a first user using an external email client into a persistent message to a second user using a chat-based persistent messaging system is disclosed herein. The method includes receiving the email from the external email client at a receive queue. The method also extracting at least one attribute associated with the email and extracting standard format data from the email. The method also includes determining at a message router the next destination for the standard format based on the at least one attribute. The next destination can include an on-net parsing processor and/or a message classifier. In response to determining that the next destination is the message classifier, the standard format data is processed into subcomponents representing content of the email at the message classifier. The method also includes adding the email to a persistent thread at the message classifier based on an historical interaction between the first user and the second user. The method also includes transmitting the subcomponents to respective content processing engines from the message classifier, translating the subcomponents into persistent messaging content at the respective corresponding content processing engines, converting the persistent messaging content to a persistent message at the on-net parsing processor, and transmitting the persistent message to the second user using the persistent messaging system.

In some instances, at least one attribute includes at least one of a sender's email address, a sender's name, a recipient's email address, a recipient's name, date, time, email header information, or message content included in the email.

In some instances, adding the email to persistent thread further includes matching, at the message classifier, the standard format data from the email with the historical interaction between the first user and the second user based on the at least one attribute. The at least one attribute can comprise the sender's email address and the recipient's email address. The persistent thread represents a prior historical interaction between the first user and the second user.

In some instances, adding the email to the persistent thread can further comprise determining, at the message classifier, existence of the historical interaction between the first user and the second user prior to adding the email to the persistent thread.

In some instances, the method can also include adding the content in the email to a persistent database. In some instances, the method can also include disaggregating the standard format data based on the next destination for the standard format data.

A persistent messaging system for translating an email from a first user using an external email client into a persistent message to a second user is disclosed herein. The system includes an off-net parsing processor to extract at least one attribute associated with the email and standard format data from the email. The system also includes a message router, communicatively coupled to the message router, to determine a destination for the standard format data based on the at least one attribute. The system also includes a message classifier, communicatively coupled to the message router, to process the standard format data into subcomponents that represent content of the email, to add the email to a persistent thread based on an historical interaction between the first user and the second user, and to transmit the subcomponents to content processing engines that translate the subcomponents into the persistent messaging content. The system also includes an on-net parsing processor, communicatively coupled to the message router, to convert the persistent messaging content into the persistent message, and a user interface, communicatively coupled to the on-net parsing processor, to transmit the persistent message to the second user.

In some instances, the at least one attribute includes at least one of a sender's email address, a sender's name, a recipient's email address, a recipient's name, date, time, email header information, or message content included in the email. In some instances, the message classifier is further configured to match the standard format data from the email with the historical interaction between the first user and the second user based on the at least one attribute. The at least one attribute can comprise the sender's email address and the recipient's email address. The message classifier can be further configured to determine an existence of the historical interaction between the first user and the second user prior to adding the email to the persistent thread.

In some instances, the system further comprises a persistent database, communicatively coupled to the message classifier, to store the persistent messaging content.

A method for translating a persistent message from a first user using a persistent messaging system to an email addressed to a second user using an external email client is disclosed herein. The method includes receiving the persistent message via a user interface. The method also includes transforming the persistent message into standard format data at a parsing processor. The method also includes determining a next destination for the standard format data at a message router. The next destination can be at least one of an off-net parsing processor or a message classifier. In response to determining that the next destination is a message classifier, the standard format data is processed at the message classifier into subcomponents representing content of the persistent message. The method also includes adding the persistent message to a persistent thread at the message classifier based on historical interaction between the first user and the second user. The message also includes transmitting the plurality of subcomponents from the message classifier to respective content processing engines. The method also includes translating the plurality of subcomponents to an email content at the respective corresponding content processing engines. The method also includes converting the email content to an external client email at the off-net parsing processor. The external client email can be in a format that is compatible with the external email client. The method also includes transmitting the external client email to the second user via the external email client.

In some instances, adding the persistent message to the persistent thread further includes matching, at the message classifier, the standard format data from the persistent message with the historical interaction between the first user and the second user based on at least one attribute. The at least one attribute can comprise the sender's email address and the recipient's email address. Adding the persistent message to the persistent thread can further comprise determining, at the message classifier, an existence of the historical interaction between the first user and the second user prior to adding the persistent message to the persistent thread.

In some instances, the method further comprises adding the content in the persistent message to a persistent database. In some instances, the method further comprises disaggregating the standard format data based on the next destination for the standard format data.

A persistent messaging system to translate a persistent message from a first user into an email addressed to a second user using an external email client is disclosed herein. The system includes a user interface to receive the persistent message. The system also includes an on-net parsing processor, communicatively coupled to the user interface, to transform the message into standard format data. The system also includes a message router, communicatively coupled to the on-net parsing processor, to determine a next destination for the standard format data. The system also includes a message classifier, communicatively coupled to the message router, to add the persistent message to a persistent thread based on historical interaction between the first user and the second user, to process the standard format data into subcomponents representing content of the persistent message, and to transmit the subcomponents to content processing engines that translate the subcomponents into email content. The system also includes an off-net parsing processing, communicatively coupled to the message router, to convert the email content to the email, the email being in a format compatible with the external email client. The system also includes a send queue, communicatively coupled to the off-net parsing processor, to transmit the email to the second user via the external email client.

In some instances, the message classifier can be further configured to match the standard format data from the persistent message with the historical interaction between the first user and the second user based on at least one attribute. The at least one attribute can comprise the sender's email address and the recipient's email address. The message classifier can be further configured to determine an existence of the historical interaction between the first user and the second user prior to adding the persistent message to the persistent thread. In some instances, the system further comprises a persistent database, communicatively coupled to the message classifier, to store the persistent messaging content in the persistent message.

The systems, apparatus, and methods disclosed herein modernize text messaging by using a conversational threaded messaging user interface while translating SMS, MIMS, and other messaging systems into a persistent messaging environment. In some embodiments, a conversational threaded messaging approach uses a conversational approach in which all messages between people and/or groups are organized together. In some embodiments, the messages are organized in a context dependent manner. The systems, apparatus, and methods disclosed herein can include a translation engine that can parse, route, classify, process, and parse again to convert a text message into a persistent message. The disclosed systems, apparatus, and methods can also convert a persistent message into a text message.

A method for translating a text message from a first user using an external text client into a persistent message to a second user using a chat-based persistent messaging system is disclosed herein. The method includes receiving the text message from the external text client at a receive queue. The method also includes at an off-net parsing processor, extracting at least one attribute associated with the text message and extracting standard format data from the text message. The method also includes determining at a message router the next destination for the standard format based on at least one attribute. The next destination can be at least one of the on-net parsing processors or a message classifier. The method also includes in response to determining that the next destination is the message classifier, processing the standard format data into subcomponents representing content of the text message. The method also includes adding the text message to a persistent thread at the message classifier based on a historical interaction between the first user and the second user. The method also includes transmitting the subcomponents to respective content processing engines from the message classifier, translating, at the respective content processing engines, the subcomponents into persistent messaging content, converting the persistent messaging content to a persistent message at the parsing processor, and transmitting the persistent message to the second user using the persistent messaging system.

In some instances, adding the text message to a persistent thread further includes matching, at the message classifier, the standard format data from the text message with the historical interaction between the first user and the second user based on at least one attribute. The attribute can comprise the name and/or phone number of the first user (sender) and the name, phone number, and/or unique (numeric) ID of the second user (recipient). The system sends from a unique number (ID or phone number) and receives from that same unique number to match the sent or received message from the recipient. The method can further include determining, at the message classifier, existence of the historical interaction between the first user and the second user prior to adding the text message to the persistent thread.

In some instances, the method can also include adding the content in the text message to a persistent database. In some instances, the method can also include disaggregating the standard format data based on the next destination for the standard format data. In some instances, the text message is a Short Message Service (SMS).

A persistent messaging system for translating a text message from a first user using an external text client into a persistent message to a second user is described herein. The system can include an off-net parsing processor to extract at least one attribute associated with the text message and standard format data from the email. The system can also include a message router, communicatively coupled to the message router, to determine a destination for the standard format data based on the at least one attribute. The system can also include a message classifier, communicatively coupled to the message router, to process the standard format data into subcomponents that represent content of the text message, to add the text message to a persistent thread based on an historical interaction between the first user and the second user, and to transmit the subcomponents to content processing engines that translate the subcomponents into the persistent messaging content. The system can also include an on-net parsing processor, communicatively coupled to the message router, to convert the persistent messaging content into the persistent message. The system can also include a user interface, communicatively coupled to the on-net parsing processor, to transmit the persistent message to the second user.

In some instances, the message classifier can be further configured to match the standard format data from the text message with the historical interaction between the first user and the second user based on the at least one attribute. The at least one attribute can comprise at least one of a name of the first user, a phone number of the first user, a name of the second user, a phone number of the second user, or a unique numerical ID. The message classifier can be further configured to determine an existence of the historical interaction between the first user and the second user prior to adding the text message to the persistent thread.

In some instances, the system can further include a persistent database, communicatively coupled to the message classifier, to store the persistent messaging content in the text message. In some instances, the text message is a Short Message Service (SMS).

A method for translating a persistent message from a first user using a chat-based persistent messaging system to a text message addressed to a second user using an external text client is disclosed herein. The method includes receiving the persistent message via a user interface. The message also includes transforming the persistent message into standard format data at an on-net parsing processor. The method also includes determining a next destination for the standard format data at a message router. The next destination can be the off-net parsing processor, a message classifier, or both. The method also includes in response to determining that the next destination is the off-net parsing processor, processing the standard format data at the message classifier into subcomponents representing content of the persistent message. The method also includes adding the persistent message to a persistent thread at the message classifier based on a historical interaction between the first user and the second user. The message also includes transmitting the subcomponents from the message classifier to respective content processing engines. The method also includes translating the subcomponents to a text message content at the respective corresponding content processing engines. The method also includes transmitting the text message to the second user via the external text client.

In some instances, the method also includes transmitting the text message content from the respective content processing engines to the external email client via the message classifier and the message router. In some instances, adding the persistent message to the persistent thread further includes matching, at the message classifier, the standard format data from the persistent message with the historical interaction between the first user and the second user based on at least one attribute. The at least one attribute can comprise the sender's email address and the recipient's phone number.

In some instances, adding the persistent message to the persistent thread can further include determining, at the message classifier, an existence of the historical interaction between the first user and the second user prior to adding the persistent message to the persistent thread. In some instances, the method further includes adding the content in the persistent message to a persistent database. In some instances, the method further includes disaggregating the standard format data based on the next destination for the standard format data.

A persistent messaging system to translate a persistent message from a first user into a text message addressed to a second user using an external text message client is described herein. The system includes a user interface to receive the persistent message. The system also includes an on-net parsing processor, communicatively coupled to the user interface, to transform the message into standard format data. The system also includes a message router, communicatively coupled to the on-net parsing processor, to determine a next destination for the standard format data. The system also includes a message classifier, communicatively coupled to the message router, to add the persistent message to a persistent thread based on historical interaction between the first user and the second user, to process the standard format data into subcomponents representing content of the persistent message, and to transmit the subcomponents to content processing engines that translate the subcomponents into text message content. The system also includes an off-net parsing processing, communicatively coupled to the message router, to convert the text message content to the text message, the text message being in a format compatible with the external text message client. The system also includes a send queue, communicatively coupled to the off-net parsing processor, to transmit the text message to the second user via the external text message client.

In some instances, the message classifier can be further configured to match the standard format data from the persistent message with the historical interaction between the first user and the second user based on at least one attribute. The at least one attribute can comprise the sender's email address and the recipient's email address. The message classifier can be further configured to determine an existence of the historical interaction between the first user and the second user prior to adding the persistent message to the persistent thread.

In some instances, the system further includes a persistent database, communicatively coupled to the message classifier, to store the persistent messaging content in the persistent message. In some instances, the text message is a Short Message Service (SMS).

All combinations of the foregoing concepts and additional concepts are discussed in greater detail below (provided such concepts are not mutually inconsistent) and are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
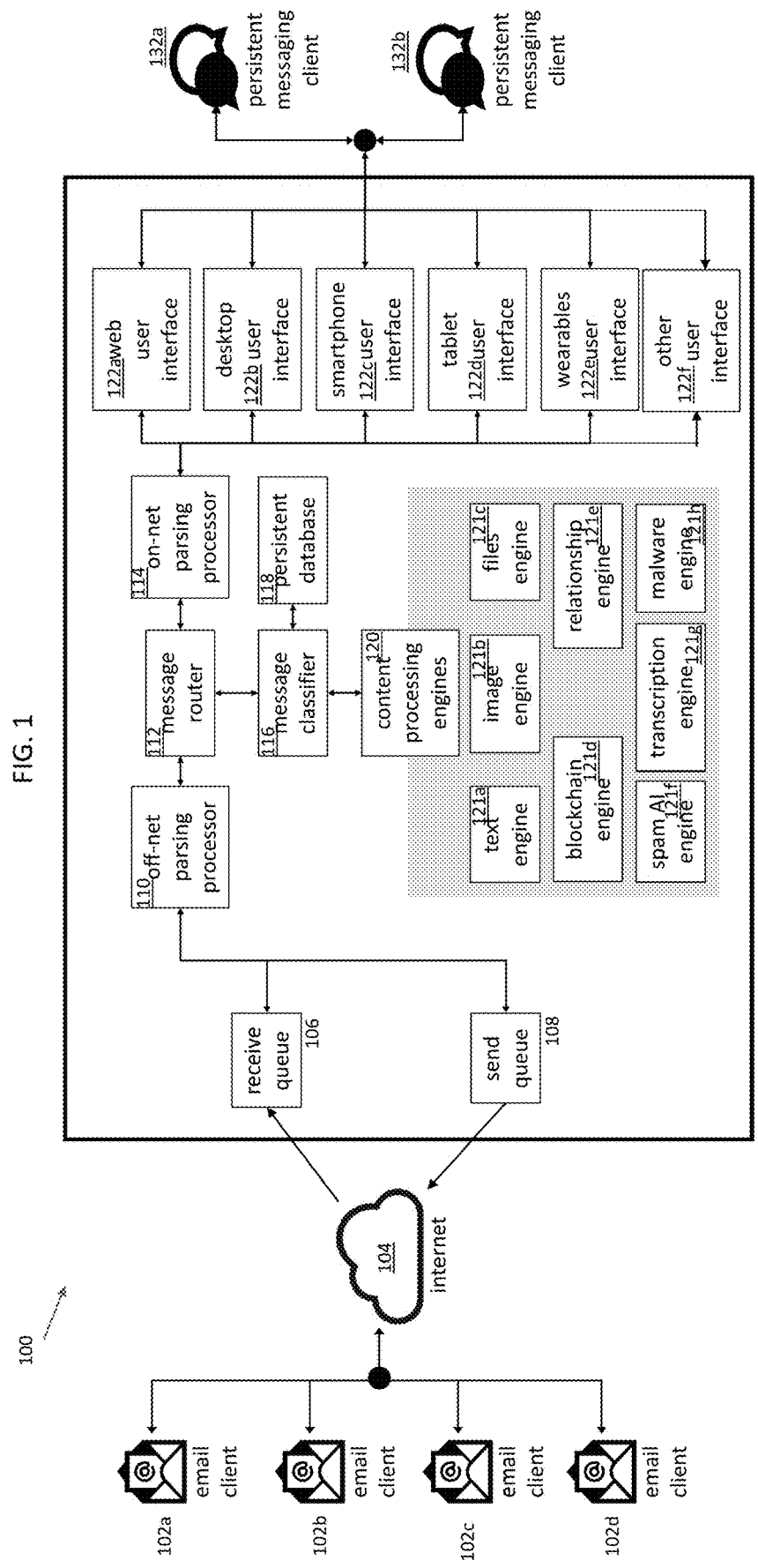
FIG. 1 shows an example implementation of a platform for users to exchange emails and persistent messages.

The present disclosure describes concepts related to, and implementations of, systems, apparatus, and methods for translating emails to a persistent messaging environment and vice versa. The present disclosure also describes concepts related to, and implementations of, systems, apparatus, and methods for translating text messages to a persistent messaging environment and vice versa. In some implementation, the same systems, apparatus, and methods described herein can perform both—translating emails to a persistent messaging environment and vice versa as well as translating text messages to a persistent messaging environment and vice versa.

With the explosion of different communication modalities and applications, communication between users has become fragmented. Users require separate applications, accounts, and login credentials to interact with friends, family, and co-workers. Each of these applications offer different user experiences. Users need to check each of these different applications to keep up.

Traditional Communication Modalities

Email is one of the most popular forms of communication today. However, email suffers from various technological problems, including spam, malware, attachment size limitations, security issues, privacy issues, information overload, etc. In addition, emails do not enable real-time interaction. Emails are often slow, and it is easy to lose context since email messages are not stored as conversational threads. Put differently, emails are often grouped by subject line, so different emails between different users with a shared subject line are put under a single thread. Unfortunately, grouping/threading by subject does not necessarily provide contextual information about prior interactions or relations between two users. Worse, emails with the same subject line but different subjects may be grouped in the same thread, which is why many users turn off the grouping feature in Microsoft Outlook, Gmail, and other conventional email platforms.

Text messaging is another popular form of communication. Unfortunately, text messaging is limited in its capabilities. For instance, text messages require two users communicating with each other to use a cellular platform. Text messages also have character limits, are limited in the types of media they support within the message, do not support hyperlinked or embedded media, do not synchronize across user devices or text clients, and do not work across different computing platforms including laptops, desktop computers, wearable devices, or other user interfaces that have compute and network connectivity. Text messages also do not allow messages to be edited or deleted after they are sent and cannot be shared or forwarded to other users. In addition, text messages have limited group capabilities and are typically designed for one-to-one type messaging interactions only. Text messages also do not typically support the recipient's ability to react to a message; rather, they are limited to only a textual reply.

Persistent Messaging Environment

The systems, apparatus, and methods disclosed herein provide a persistent messaging environment or persistent messaging platform (also referred to herein as "platform") that includes a function to seamlessly convert messages from different communication modalities into persistent messages and vice versa. A persistent message can converge communication modalities to allow a combination of textual, vocal, and visual communications into a single seamless conversational communication and productivity experience. Rather than a transactional exchange between two users with a defined start and end, a persistent messaging thread includes exchanges between two users over a long period of time (e.g., a persistent message maintains these exchanges in perpetuity if desired). A persistent messaging thread enables contextual exchange between two or more users and is not organized solely based on subject line, like email, or one-off communications, like text messages.

Advantages Over Traditional Email and Text Messaging

The ability to convert messages from different communication modalities into persistent messages enables migration of different communication modalities into a single communication platform. Put differently, the persistent messaging environment is platform-agnostic. That is, messages from different communication modalities such as email, text, etc., can be translated into a persistent message. The platform disclosed herein enables users to switch from fragmented communications on different communication modalities to a single consolidated communication modality. This is an advantage over email and text messaging, which cannot be consolidated easily, if at all.

The platform disclosed herein provides a conversational interface that is backwards compatible with the Email market and the text market. Put differently, when two or more users connect on the platform, it marks the beginning of a persistent messaging thread. The persistent messaging thread (also referred to as a "messaging thread") enables contextual exchange between two or more users. That is, related messages are stored as a single thread. The series of threaded messages between two or more users can include images, video, audio, etc. The message history can be maintained in perpetuity. More specifically, the content in the messages (e.g., video content, audio content, image content, etc.) can be stored on a cloud platform and can be retrieved on demand at corresponding endpoints (i.e., delivered to respective users on their smartphone, desktop computers, or any other suitable computing device). This data can be stored in encrypted and secure repositories and becomes the user's data to retrieve, use, and/or exchange. In contrast, text messages are saved locally on devices and are not maintained in perpetuity. Similarly, emails are often stored locally with a synced host on the cloud.

The platform disclosed herein makes it easier and faster to store and retrieve information. Based on the context, the users can access the appropriate messaging thread in order to retrieve information. More specifically, since messages from different communication modalities can be stored on a single cloud platform, all the information from the different communication modalities can be consolidated. This information can be retrieved and delivered to a corresponding endpoint at any time by accessing the appropriate messaging thread. Some non-limiting examples of endpoints include smartphones, tablets, smartwatches, laptop computers, desktop computers, etc. Put differently, information in messaging threads associated with a user can be consolidated and made available to the user on any computing device chosen by the user, making it easier for the user to store and retrieve information.

The platform disclosed herein also provides several advantages over text messaging. Unlike conventional text messaging, the platform disclosed herein does not have character limits. The platform also offers wide support to different media types, cloud synchronization across all devices and platforms, and continuous conversation with use of persistence. The platform disclosed herein also works across several hardware devices such as desktop, laptop, wearable devices, and other user interfaces that have compute and network connectivity. The platform disclosed herein can be used to edit and delete messages after they are sent. It can operate with fewer file size limitations and offers delivery and read receipts. It can be used to react to a message with emojis, reply to and forward text messages, transition between email and text messaging clients, and send hyperlinks and embedded media within messages.

The platform disclosed herein provides enhanced security compared to email, text messaging, and other communication modalities. The systems, apparatus, and methods disclosed herein can include built-in encryptions and/or blockchain(s) to authenticate and confirm authenticity of the communication as well as encryption to secure the content of the communications. The digital identity of users can be verified and validated across the blockchain. Blockchain specifically allows the user's identity to be secure as well as portable and authenticatable as an original (for example, a digital identity can be verified for authenticity based on an original blockchain sequence created at the time the content was created).

For instance, if a first user sends an email message to a second user and the second user is connected to the persistent messaging platform, then the blockchain authenticates the digital identity (e.g., email id) of the first user. In this manner, the second user can be certain of the authenticity of the email id (i.e., that the email id in fact belongs to the first user) from which the second user gets the email. This makes it easier to filter unwanted messages, including spam and phishing emails. The end-to-end encryption can be a key value proposition to scrutinize messages. The off-net messages can be authenticated through blockchain hash.

The persistent messaging platform can create contacts in an intelligent manner (also referred to herein as "smart contracts"). Once a user creates a digital identity on the platform, the digital identity can be automatically linked with the user's family, friends, coworkers, and colleagues. If the user's connections have more than one digital identity (e.g., a first digital identity for personal and a second digital identity for work), the smart contacts can automatically synchronize these multiple digital identities into the appropriate contact list. In some instances, a single digital identity of the user can connect with all of the user's contacts. In some instances, the user can create a separate digital identity to connect with a subset of the user's contacts. The user can switch between all of the user's digital identities.

Conventionally, most people use basic contacts, each of which include a name, email, phone, address, etc. for another person. Each person stores this basic contact information for these other people in a contacts list for use at a later time. Conversely, an inventive smart contact is a profile that each user creates for himself or herself. The smart contact includes that person's contact information, relationships, education, likes/hobbies, and more, including social profile information. A user can choose to share some or all of their smart contact info with their connections. Because each person maintains his or her own smart contact, instead of basic contact information for other people, the maintenance burden is lower for each user. In addition, there is less chance that a given user's contact information will become out-of-date, as a user's updates to his or her own smart contact information (e.g., a new work email address or phone number) automatically propagate to the user's connections.

The persistent messaging platform enhances privacy by providing the ability to tailor the privacy settings for each digital identity element. A digital identity element can include name, phone number, email id, relationships, and/or the like. For instance, if the single digital identity has multiple digital identity elements (e.g. Name, Email, Phone, Address, Website, etc.), each of these elements can have a different privacy setting associated with it to allow or restrict sharing. In addition, each user can be given a key to lock the information and associated privacy settings in their corresponding contact.

The persistent messaging platform enables portability of contacts. Once a digital identity is created on the platform, the blockchain interconnects thereby connecting the smart contacts. The blockchain with cloud-sync automatically updates the contact list for each user without the necessity to do so manually.

The persistent messaging platform enables transmission of large files. Instead of sending attachments, the users that are registered on the platform or users outside of the platform can send a link to the file. The file itself can be stored on a server in the system. The file stored on the server can be accessed by accessing a private or public link. Therefore, unlike emails, the platform disclosed herein is not limited by attachment size limitations. For example, if a file is less than 10 MB in size, the system may send the file directly to the recipient as in a normal email. If the size of the file is greater than 10 MB, the persistent messaging platform can automatically send a link to the file stored on a cloud server instead of transmitting the file with the message. Automatically replacing oversized files with links reduces bandwidth consumption and reduces the chance of an off-net server refusing a message because an attached file is too large while still providing the message and file to the intended recipient.

An off-net user is a user outside of the persistent messaging environment and an on-net user is a user inside of the persistent messaging environment. An email client can be an external email client such as Gmail®, Yahoo®, or Outlook®. A text messaging client according to some implementations of this disclosure can be an external text messaging client available on an Android®, iPhone®, or Microsoft® or other mobile operating system (OS). A messaging thread is a series of related messages in a contextual exchange between users. For instance, once an initial message is sent then all responses to the message can be included in a continuing messaging thread. Typically, a single message is destined for either an individual thread or a group thread, but not both.

Persistent messaging refers to a series of threaded messages between individuals or groups where the content can include anything (e.g., image, video, audio, GIFs, text, token, and/or the like) that can be exchanged digitally. Persistent messaging can also include a message history which can be maintained in perpetuity if desired. The interaction between two or more individuals can use different communication modalities (e.g., text, images, animations, emojis, motion video, etc.) that can all be consolidated into a singular contextual conversational interaction. A persistent messaging environment can include a complete on-net user experience including all users participating in the persistent messaging environment. Email content can refer to content within an email. An email can include the email content and the message header. Text messaging content can refer to content within an SMS, MMS, RCS, or other mobile messaging application. A text message can include messaging content including characters as well as imagery. Persistent message content can refer to the content portion of a persistent message. The persistent message can include the content and additional information needed to route and display the persistent message appropriately.

The systems, apparatus, and methods disclosed herein can provide a platform for users to exchange emails, text messages and persistent messages. In order to use the systems disclosed herein, certain users may be registered to use the platform and can participate as on-net users. Other users may use communication modalities outside of the platform and can participate as off-net users. Both on-net and off-net users can exchange messages through the platform to exchange content within the corresponding messages through their respective user interfaces.

Email to Persistent Messaging

FIG. 1 is an example implementation of a platform for users to exchange emails and persistent messages. In some implementations, the platform 100 is a software platform that can be implemented on one or more processors executing computer-readable instructions stored on associated memories. This platform 100 includes the following elements and/or modules, each of which can be implemented on one or more processors. In some implementations, a combination of one or more elements and/or modules of platform 100 can be implemented on one or more processors.

Email Client 102

The Email client 102 can include a Post Office Protocol Version 3, Internet Message Access Protocol, Exchange, or other mail client that is capable of sending and receiving emails. This can include an email client on a PC, smartphone, or tablet.

Receive Queue 106

The receive queue 106 can receive emails from an internet connection (e.g., Internet 104) and through an email service provider. Email that is addressed to an on-net user in the persistent messaging environment is first received at the receive queue 106 via Internet 104.

Send Queue 108

The send queue 108 can send emails from the persistent messaging environment to an email service provider via the Internet 104. Messages that are addressed to off-net email addresses are transmitted from the send queue 108 via the Internet 104 to an email exchange.

Off-Net Parsing Processor 110

After an email has been received through the receive queue 106, the off-net parsing processor 110 analyzes the content in the email and disaggregates the content components into a standard format (e.g., JSON, XML, etc.). For example, basic Internet email format, such as described in Request for Comments (RFC) 5532, can be parsed by the off-net parsing processor 110. The off-net parsing processor can parse and convert the RFC 5532 format into an email header and body with different tags. These tags can define fields such as priority, subject, etc. The off-net parsing processor 110 can convert the email into persistent message standard format which has a header and body with set of name/value pairs. These tags are pre-defined for each message type. The email message is converted into a persistent message with message type as email and appropriate tags in the body.

The standardized content serves to create a predictable content data set for the Content Processing Engines 120 (described below) to adapt and modify for translation into persistent messaging interactions.

In some implementations, during conversion from persistent message to an email, the off-net parsing processor 110 also receives data from the message router 112 after it has been processed by the Content Processing Engines 120. This data is then assembled into an email and forwarded to the Send Queue 108 for transmission to the Internet 104.

Message Router 112

The Message Router 112 receives data from the Off-net Parsing Processor 110, the On-net Parsing Processor 114, and the Message Classifier 116 to determine the next destination for the data.

If data is received from the Off-net Parsing Processor 110 or the On-Net Parsing Processor 114, it typically is routed to the Message Classifier 116 that then processes standard format data into its subcomponents.

If data is received from the Message Classifier 116, it is typically routed to either the On-Net Parsing Processor 114 to be assembled into a persistent message or to the Off-Net Parsing Processor 110 to be assembled into an email depending upon where the data is intended to be sent by the sender.

On-Net Parsing Processor 114

Once the on-net parsing processor 114 receives a persistent message from the persistent messaging user interface (e.g., web user interface 122a, desktop user interface 122b, smartphone user interface 122c, tablet user interface 122d, wearables user interface 122e, and/or the like), the on-net parsing processor 114 can analyze the content in the persistent messages and can disaggregate the content components into a standard data format. The standard content form can serve to create a predictable content data set for the content processing engines 120 to adapt and modify for translation into email messages.

In some implementations, during conversion from an email to a persistent message, the on-net parsing processor 114 also receives data from the message router 112 after standard form data has been processed and routed from the content processing engines 120. This data is then assembled into a persistent message and forwarded to the persistent messaging user interface for viewing by the persistent messaging client 132, for example, persistent messaging client 132a and persistent messaging client 132b.

Message Classifier 116

The message classifier 116 can process incoming and outgoing standard form data into its subcomponents and can separate the subcomponent parts. For instance, a message comprises header and a body. The header defines metadata elements. Metadata defines characteristics of the message, such as type, possible formats such as video format or character sets, such as UTF-8. The body can have several subcomponents depending on the message type defined in the header. For example, message type email can include recipient list, content, attachments, and signatures. A meetup message type can include calendar components that define date/time, time zone, location and invitee components, etc.

The message classifier 116 can transmit the subcomponent parts to the appropriate content processing engine 120. For instance, the message classifier 116 can detect the type of content (e.g., text, image, audio, video, etc.) in the subcomponent parts. This can include subcomponent content in textual, audio, or video form including providing services and handling for identification, ranking, blockchain processing, relationship analysis, spam filtering, transcription, malware mitigation, and other content. Based on the detected content type, the message classifier 116 transmits each subcomponent part to the appropriate content processing engine 120, which processes the subcomponent part and returns it to the message classifier 116 for matching content.

The message classifier 116 can also match content received from both the email client 102 and the persistent messaging client 132 to ensure a contiguous conversation from prior interactions that may have occurred between the two users. For instance, when an email message is converted from standard email format (Internet Email message format as defined by RFC 5322)) into persistent message format, one or more identification information in the email message such as email message id and/or reply to original message id can be used by the message classifier 116 to match content. The message classifier 116 can use the identification information to identify if the email message should constitute a new thread or if it is a response to an existing persistent message. This matching of historical content maintained over time within the persistent messaging database 118, ensures that interactions are maintained between individuals or groups with context.

Persistent Database 118

The persistent database 118 contains a record of all interactions that have occurred on the platform. This is a storage database with address information, standard form data, content, and more that was exchanged between off-net and on-net as well as on-net to on-net users.

Content Processing Engines 120

The Content Processing Engines 120 transforms email content into persistent messaging content and vice-a-versa. Each content processing engine 120 specializes in translation of content using techniques dependent upon the type of content in need of translation services. Each content processing engine 120 runs as an application within the cloud architecture.

Text Engine 121*a*—processes and transforms textual related content to include any lexicon including symbols and other standard computer characters. These include character languages from around the world.

Image Engine 121*b*—processes and transforms visual related content to include still images as well as video related content. This can include processing of images with additional filters, image editing (to include resolution, color modification, etc.) or other image processing capability that may be needed or requested by the platform and its users.

Files Engine 121*c*—processes and transforms file related content to ensure compatibility between the two environments. This can include file processing, reformatting, compression, file conversion, and file integrity actions.

Blockchain Engine 121*d*—processes any content that requires handling of blockchain components to include verification, authentication, encryption, hashing, or other automated manipulation of content to support blockchain oriented services and features. The blockchain engine 121*d* can allow for portability and security of messages and/or contacts shared via the platform.

Relationship Engine 121*e*—processes content that has a relational context to it. This includes understanding personal, business, or entity degrees of separation, data characteristics that offer insights or extrapolations about personal, business, or entity connections that may exist, and other elements that drive better understanding about the connections between parties Spam AI Engine 121*f*—seeks to identify, isolate, and mitigate possible or actual spam content that is intended to solicit, threaten, or crowd a user's interaction experience. This engine acts upon spam to reduce and remove spam.

Transcription Engine 121*g*—translates between spoken languages to allow a native speaker in one country to have their persistent message converted to another spoken language for either on-net or off-net users and vice-a-versa. The transcription engine 121*g* can receive spoken language via emails or text messages that include audio or video recordings. It can also receive spoken messages that come from the persistent messaging client. The platform 100 may also support phone calling, with incoming voicemails routed to the transcription engine 121*g* for processing the audio processed into text for display on the persistent messaging client.

Malware Engine 121*h*—seeks to identify, isolate, and mitigate possible or actual threats including virus, malware, or phishing threats that may be targeted to users in email and/or persistent messaging. This engine includes industry standard, best practice, and proprietary technologies to mitigate threats within communications and content.

User Interface 122

The user interface 122 enables an on-net user to consume and interact with the content delivered from the on-net parsing processor 114. The user interface 122 also enables the on-net user to create and publish content to the on-net parsing processor 114 destined for either another persistent messaging client 132 or destined for an email client 102.

Web User Interface 122*a*—The web user interface 122*a* provides content in a resolution and delivery mechanism to be provided through any number of modern computer web browsers including Google Chrome®, Mozilla Firefox®, Microsoft Internet Explorer®, Microsoft Edge®, Safari®, or others.

Desktop User Interface 122*b*—The desktop user interface 122*b* provides content in a resolution and delivery mechanism available through a downloadable software application that can be installed and run on a computer.

Smartphone User Interface 122*c*—The smartphone user interface 122*c* provides content in a resolution and delivery mechanism available through a downloadable software application to be installed on a smartphone including devices running Apple® iOS, Android OS, or other mobile operating systems.

Tablet User Interface 122*d*—The tablet user interface 122*d* provides content in a resolution and delivery mechanism available through a downloadable software application to be installed on a tablet including devices running Apple® iOS, Android OS, or other mobile operating systems.

Wearable User Interface 122*e*—The wearable user interface 122*e* provides content in a resolution and delivery mechanism available through a downloadable software application to be installed on a wearable device including devices running Apple® Watch OS, Android Wear OS, or other wearable operating systems.

Other User Interface 122*f*—The other user interface 122*f* provides content in a resolution and delivery mechanism available on any other device or system that contains compute and network connectivity. As compute and network connectivity is introduced into more devices of all types, an installed software application can be provided to deliver persistent messaging to these devices or services. For example, the other user interface 122 could be implemented in a car with a software application and display, such as a Tesla or Rivian, to deliver persistent messaging.

Persistent Messaging Client 132

The persistent messaging client 132 allows a user to create, modify, view, or delete persistent message content in an interaction. It provides a graphical user interface that allows the user to use the services, whether the persistent message content is delivered from another persistent messaging client 132 or from an email client 102. Persistent message content can include textual, vocal, or visual communications and content as well as other interactions that can be supported by the platform.

Translating Email to Persistent Message

Figure 2:
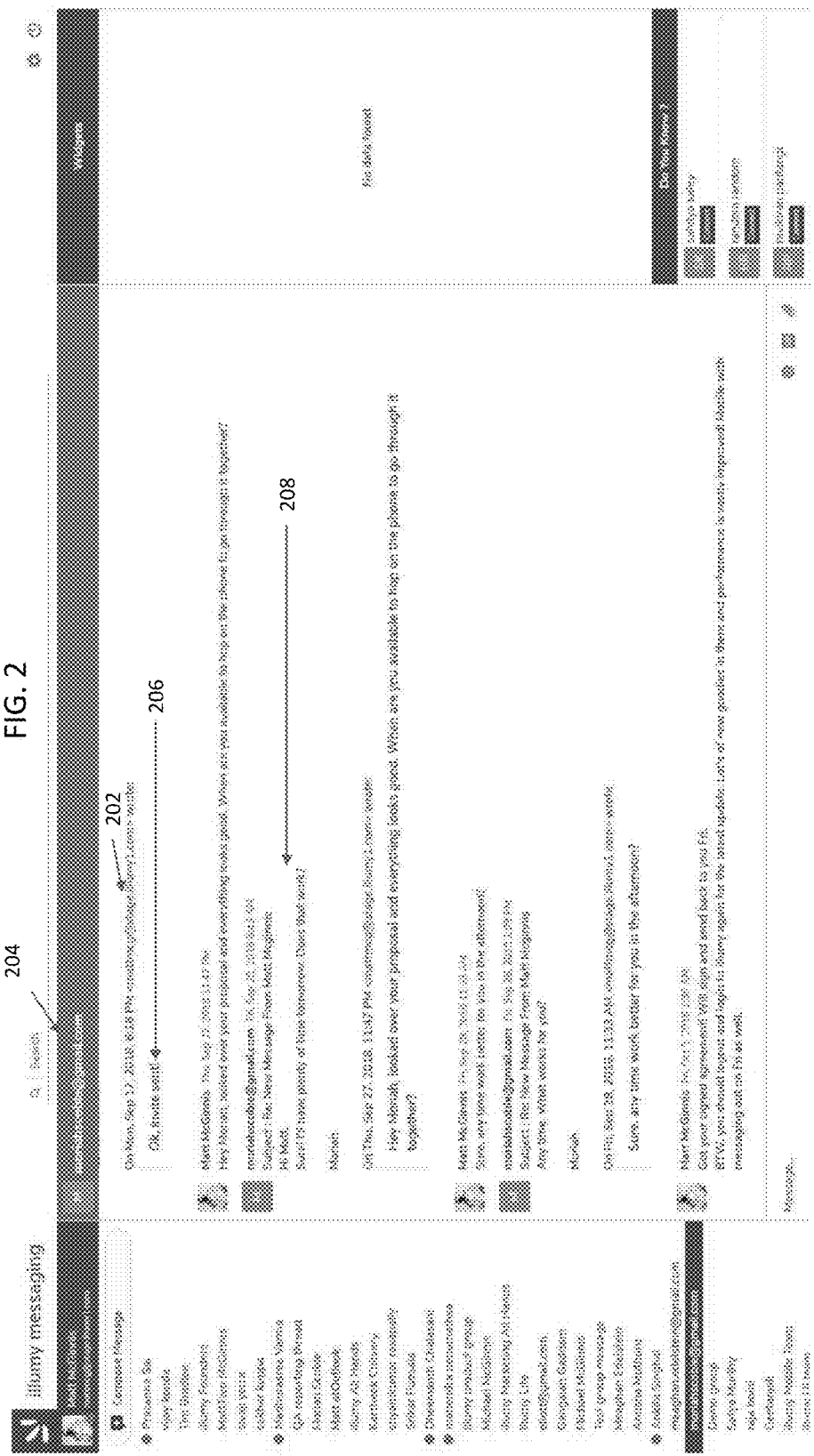
FIG. 2 illustrates an example interface of the platform of FIG. 1 when an email message is received from an off-net user addressed to an on-net user.

FIG. 2 illustrates an example interface of the platform illustrating an email that is sent from an off-net user to an on-net user. In this example, an off-net user 204 sends an email using an email client (e.g., Gmail®) to an on-net user 202. The on-net user 202 responds to the email using the persistent messaging platform (e.g., response 206). The off-net user 204 receives the persistent message transformed as an email on the email client. The off-net user 204 responds to the persistent message in the form of email which is once again transformed to a persistent message (e.g., message 208) that the on-net user 202 can read with the persistent messaging platform. In this manner, the back and forth communication between the off-net user 204 and the on-net user 202 can form a series of threaded messages. This thread can be maintained in perpetuity if desired.

Figure 3:
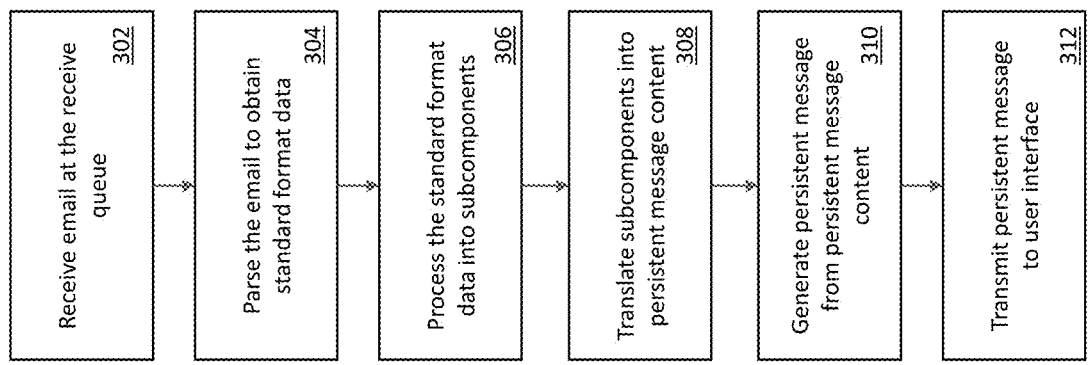
FIG. 3 shows a flowchart illustrating a method of translating an email message from an off-net user to a persistent message.

FIG. 3 shows a flowchart illustrating a method of translating an email message from an off-net user to a persistent message. At 302, an email that is sent from an email client (e.g., email client 102 in FIG. 1) can be received at the receive queue (e.g., receive queue 106 in FIG. 1). The receive queue collects the email and ensures message integrity. For example, the receive queue can ensure message integrity based on the Email Simple Mail Transfer Protocol (SMTP) standards for message receipt and acceptance. The email can then be forwarded to the off-net parsing processor (e.g., off-net parsing processor 110 in FIG. 1).

At 304, the off-net parsing processor can parse the email to obtain email message content. For instance, the off-net parsing processor can parse the email to obtain the off-net user's email id, the name of the off-net user, the on-net user's digital identity, the name of the on-net user, users listed in the carbon copy field, users listed in the blind carbon copy field, email header information, the included email message content, and/or the like. The off-net parsing processor can also parse the email message content into a standard data format and can pass the standard data format to the message router (e.g., message router 112 in FIG. 1). The message router can determine the next destination for the standard format data. For example, the message router determines that the standard format data should be transmitted to the message classifier (e.g., message classifier 116 in FIG. 1) and transmits the standard format data to the message classifier.

At 306, the message classifier processes the standard format data into its subcomponents and transmits the subcomponents to the relevant content processing engines (e.g., content processing engine 120 in FIG. 1). At this point, the standard format data can be matched with the history of messages between the off-net user and on-net user to maintain historical context between the two parties. If no prior interaction history exists, a new persistent thread can be created.

At 308, the content processing engines translates the standard format data into persistent messaging content be it text, images, video, or any other sort of multi-media. The standard format data can then be transmitted back to the message classifier to store the standard format data in the persistent database (e.g., persistent database 118 in FIG. 1) before transmitting the persistent message content to the message router.

At 310, the message router transmits the persistent message content to the on-net parsing processor (e.g., on-net parsing processor 114 in FIG. 1) which then generates the persistent message. At 312, the persistent message can then be delivered to the user interface (e.g., user interface 122) thereby initiating interaction from the persistent messaging client (e.g., persistent messaging client 132 in FIG. 1).

Translating Persistent Message to Email

Figure 4:
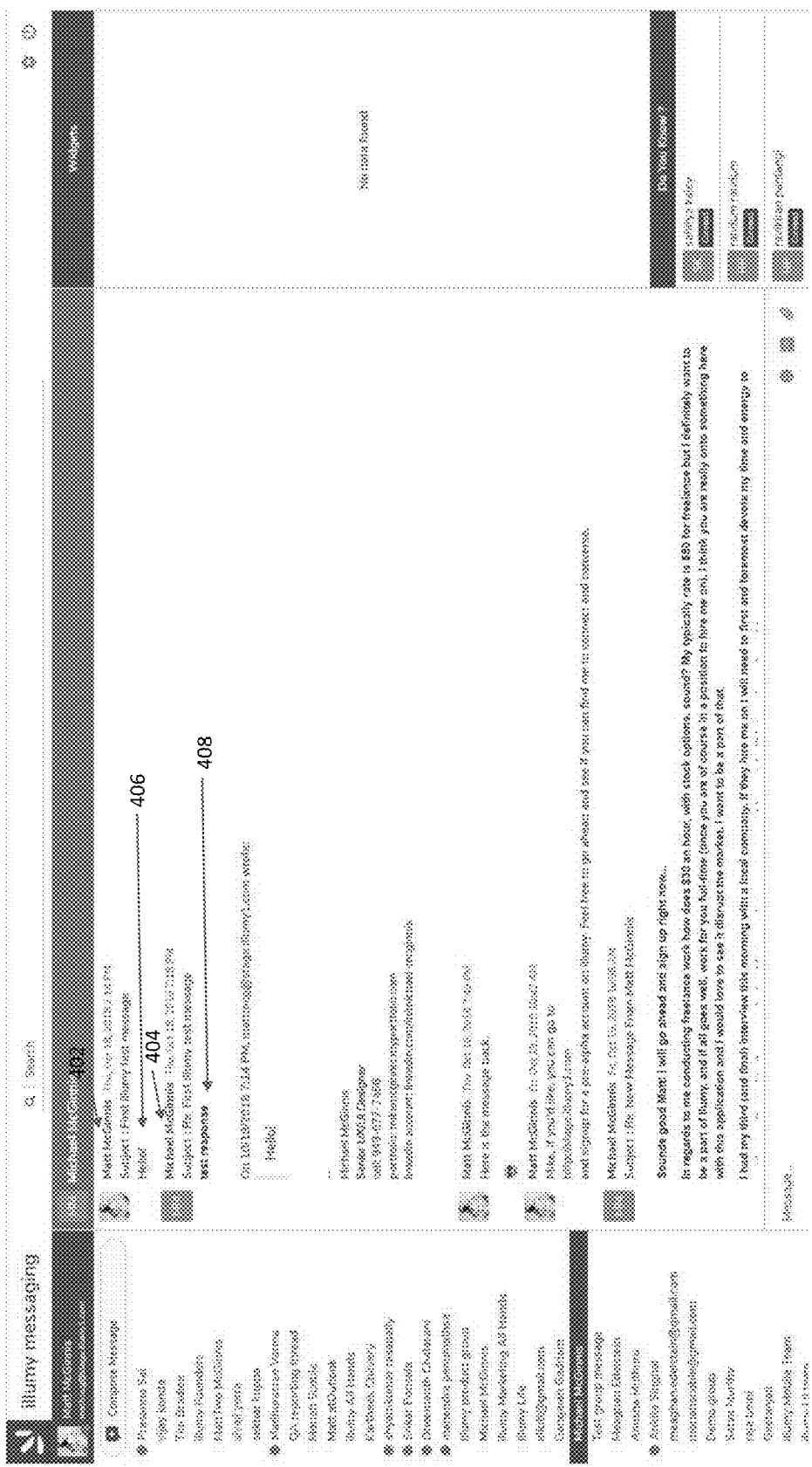
FIG. 4 illustrates an example interface of the platform of FIG. 1 when a persistent message is sent from an on-net user to an off-net email user.

FIG. 4 illustrates an example interface of the platform when a persistent message is sent from an on-net user to an off-net email user. In this example, an on-net user 402 sends a persistent message 406 via the platform 100 in FIG. 1 to an off-net user 404 using an email client (e.g., Gmail®). The platform 100 converts the persistent message 406 to an email and delivers the email to the off-net user 404 via the email client. The off-net user 404 can respond via the email client with an email, which is transformed to persistent message (e.g., message 408) and delivered to the on-net user 402 using platform 100. As discussed in the sections above, back and forth communication between the on-net user 402 and off-net user 404 forms a series of threaded messages. This thread can be maintained in perpetuity if need be.

Figure 5:
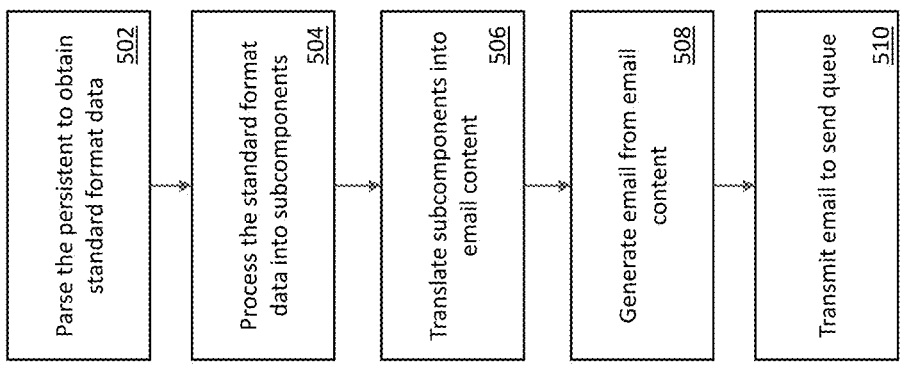
FIG. 5 shows a flowchart illustrating the method of translating a persistent message from an on-net user to an email message.

FIG. 5 shows a flowchart illustrating the method of translating a persistent message from an on-net user to an email message.

A persistent message can be sent from a persistent messaging client (e.g., persistent messaging client 132 in FIG. 1) through the persistent messaging user interface (e.g., user interface 122 in FIG. 1). At 502, an on-net parsing processor (e.g., on-net parsing processor 114 in FIG. 1) collects the persistent message and parses the persistent message into a standard format. The standard format data is forwarded to a message router (e.g., message router 112 in FIG. 1). The message router receives the standard format data and determines the next destination for where the standard format data should be handled. For example, the message router determines that the standard format data should be transmitted to a message classifier (e.g., message classifier 116 in FIG. 1) and does so.

At 504, the message classifier processes the standard format data into its subcomponents (e.g., header and body) and transmits the standard format data to relevant content processing engines (e.g., content processing engine 120 in FIG. 1). At this point, the standard format data can be matched with the history of messages between the off-net user and on-net user to maintain historical context between the two parties. If no prior interaction history exists, the message classifier creates a new persistent thread.

At 506, the content processing engines translates the standard format data into email content be it text, images, video, or any other sort of multi-media. The standard format data can then be transmitted back to the message classifier to store the standard format data in the persistent database (e.g., persistent database 118 in FIG. 1) before transmitting the email content to the message router.

At 508, the message router transmits the email content to the off-net parsing processor (e.g., off-net parsing processor 110 in FIG. 1) which then generates the email. At 510, the email can be transmitted to the send queue (e.g., send queue 108 in FIG. 1), which then sends the email from the persistent messaging environment to the internet connections. Messages that are addressed to off-net email addresses can be transmitted from the send queue to the internet mail exchange.

Text to Persistent Messaging

Figure 6:
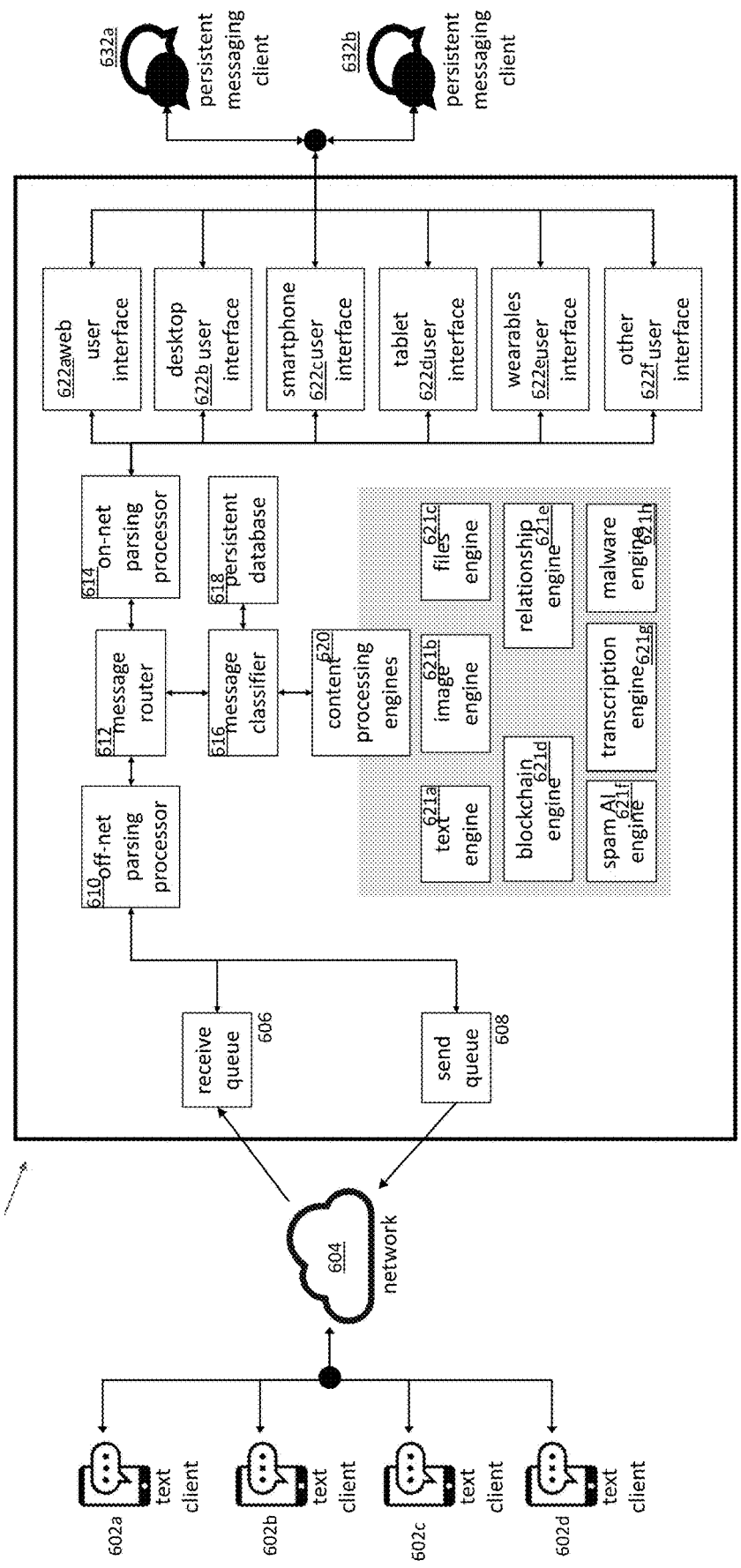
FIG. 6 shows an example implementation of a platform for users to exchange text messages and persistent messages.

FIG. 6 is an example implementation of a platform for users to exchange text messages and persistent messages. In some implementations, the platform 600 is a software platform that can be implemented on one or more processors executing instructions stored on associated memories. This platform 600 includes the following elements and/or modules, each of which can be implemented on one or more processors. In some implementations, a combination of one or more elements and/or modules of platform 600 can be implemented on one or more processors. Although, a separate platform 600 from platform 100 is disclosed for users to exchange text messages and persistent messages, a single platform (e.g., either platform 100 or platform 600) can be used to exchange text messages and persistent messages as well as to exchange emails and persistent messages.

Text Client 602

The Text client 602 can include a Short Message Service (SMS), Multimedia Messaging Service (MMS), or Rich Communication Service (RCS) application for sending and receiving text messages from other parties. This can include a text messaging client on a PC, smartphone, or tablet.

Receive Queue 606

The receive queue 606 can receive text messages from a network connection (e.g., Network 604) and through a text messaging service provider. Text messages that are addressed to an on-net user in the persistent messaging environment are first received at the receive queue 606 via the Network 604.

Send Queue 608

The send queue 608 can send text messages from the persistent messaging environment to a text messaging service provider via the Network 604. Messages that are addressed to off-net text message phone numbers are transmitted from the send queue 608 via the Network 604 to a text messaging gateway connected to a text messaging service provider.

Off-Net Parsing Processor 610

After a text message has been received through the receive queue 606, the off-net parsing processor 610 analyzes the content in the text message and disaggregates the content components into a standard format (e.g., JSON, XML, etc.). For example, text messaging formats, such as described in Request for Comments (RFC) 5724, can be parsed by the off-net parsing processor 610. The off-net parsing processor can parse and convert the text messaging format of SMS, MMS, and RCS into content pieces with different tags. These tags can define fields such as priority, subject, etc. The off-net parsing processor 610 can convert the text message into persistent message standard format which has a header and body with set of name/value pairs. These tags are pre-defined for each message type. The text message is converted into a persistent message with message type as a text message and appropriate tags in the body.

The standardized content serves to create a predictable content data set for the Content Processing Engines 620 (described below) to adapt and modify for translation into persistent messaging interactions.

In some implementations, during conversion from persistent message to a text, the off-net parsing processor 610 also receives data from the message router 612 after it has been processed by the Content Processing Engines 620. This data is then assembled into an email and forwarded to the Send Queue 608 for transmission to the Network 604.

Message Router 612

The Message Router 612 receives data from the Off-net Parsing Processor 610, the On-net Parsing Processor 614, and the Message Classifier 616 to determine the next destination for the data.

If data is received from the Off-net Parsing Processor 610 or the On-Net Parsing Processor 614, it typically is routed to the Message Classifier 616 that then processes standard format data into its subcomponents.

If data is received from the Message Classifier 616, it is typically routed to either the On-net Parsing Processor 614 to be assembled into a persistent message or to the Off-net Parsing Processor 610 to be assembled into a text depending upon where the data is intended to be sent by the sender.

On-Net Parsing Processor 614

Once the on-net parsing processor 614 receives the persistent message from the persistent messaging user interface (e.g., web user interface 622a, desktop user interface 622b, smartphone user interface 622c, tablet user interface 622d, wearables user interface 622e, other user interface 622f, and/or the like), the on-net parsing processor 614 can analyze the content in the persistent messages and can disaggregate the content components into a standard data format. The standard content form can serve to create a predictable content data set for the content processing engines 620 to adapt and modify for translation into text messages.

In some implementations, during conversion from text to persistent message, the on-net parsing processor 614 also receives data from the message router 612 after standard form data has been processed and routed from the content processing engines 620. This data is then assembled into a persistent message and forwarded to the persistent messaging user interface for viewing by the persistent messaging client 632, for example, persistent messaging client 632a and persistent messaging client 632b. If the text message is incompatible with the standard form data, the text message can first be transformed into a compatible form and then converted from the compatible form into standard format data.

Message Classifier 616

The message classifier 616 can process the standard form data into its subcomponents and can separate the subcomponent parts. For instance, a message comprises a header and a body. The header defines metadata elements. Metadata defines characteristics of the message, such as type, possible formats such as video format or character sets, such as UTF-8. The body can have several subcomponents depending on the message type defined in the header. For example, message types can include recipient list, content, attachments, and signatures. A meetup message type can include calendar components that define date/time, time zone, location and invitee components, etc.

The message classifier 616 can transmit the subcomponent parts to the appropriate content processing engine 620. For instance, the message classifier 616 can detect the type of content (e.g., text, image, audio, video, etc.) in the subcomponent parts. This can include subcomponent content in textual, audio, or video form including providing services and handling for identification, ranking, blockchain processing, relationship analysis, spam filtering, transcription, malware mitigation, and other content. Based on the detected type, the message classifier 616 can transmit the subcomponent parts to the appropriate content processing engine 620 for processing and return to the message classifier 616.

The message classifier 616 can also match content received from both the text client 602 and the persistent messaging client 632 to ensure a contiguous conversation from prior interactions that may have occurred between the two users. For instance, when a text message is converted from SMS, MIMS, or RCS format into a persistent message format, one or more pieces of identification information in the text message such as the phone number can be used by the message classifier 616 to match content. The message classifier 616 can use the identification information to identify if the text message should constitute a new thread or if it is a response to an existing persistent message. This matching of historical content maintained over time within the persistent messaging database 618, ensures that interactions are maintained between individuals or groups with context.

The message classifier 616 can match the content once the subcomponent parts have been processed by the appropriate content processing engine 620.

Persistent Database 618

The persistent database 618 contains a record of all interactions that have occurred on the platform. This is a storage database with address information, standard form data, content, and more that was exchanged between off-net and on-net as well as on-net to on-net users.

Content Processing Engines 620

The Content Processing Engines 620 transforms text content into persistent messaging content and vice-a-versa. Each content processing engine 620 specializes in translation of content using techniques dependent upon the type of content in need of translation services. Each content processing engine 620 runs as an application within the cloud architecture.

Text Engine 621*a*—processes and transforms textual related content to include any lexicon including symbols and other standard computer characters. These include character languages from around the world.

Image Engine 621*b*—processes and transforms visual related content to include still images as well as video related content. This can include processing of images with additional filters, image editing (to include resolution, color modification, etc.) or other image processing capability that may be needed or requested by the platform and its users.

Files Engine 621*c*—processes and transforms file related content to ensure compatibility between the two environments. This can include file processing, reformatting, compression, file conversion, and file integrity actions.

Blockchain Engine 621*d*—processes any content that requires handling of blockchain components to include verification, authentication, encryption, hashing, or other automated manipulation of content to support blockchain oriented services and features. The blockchain engine 121*d* can allow for portability and security of messages and/or contacts shared via the platform.

Relationship Engine 621*e*—processes content that has a relational context to it. This includes understanding personal, business, or entity degrees of separation, data characteristics that offer insights or extrapolations about personal, business, or entity connections that may exist, and other elements that drive better understanding about the connections between parties Spam AI Engine 621*f*—seeks to identify, isolate, and mitigate possible or actual spam content that is intended to solicit, threaten, or crowd a user's interaction experience. This engine acts upon spam to reduce and remove spam.

Transcription Engine 621*g*—translates between spoken languages to allow a native speaker in one country to have their persistent message converted to another spoken language for either on-net or off-net users and vice-a-versa. In some implementations, the spoken language can be received by the platform 100 via an email or a text message that includes audio or video recording.

Ma/ware Engine 621*h*—seeks to identify, isolate, and mitigate possible or actual threats including virus, malware, or phishing threats that may be targeted to users in text messages and/or persistent messaging. This engine includes industry standard, best practice, and proprietary technologies to mitigate threats within communications and content.

User Interface 622

The user interface 622 enables an on-net user to consume and interact with the content delivered from the on-net parsing processor 614. The user interface 622 also enables the on-net user to create and publish content to the on-net parsing processor 614 destined for either another persistent messaging client 632 or destined for a text messaging client 602.

Web User Interface 622*a*—The web user interface 622*a* provides content in a resolution and delivery mechanism to be provided through any number of modern computer web browsers including Google Chrome®, Mozilla Firefox®, Microsoft Internet Explorer®, Microsoft Edge®, Safari®, or others.

Desktop User Interface 622*b*—The desktop user interface 622*b* provides content in a resolution and delivery mechanism available through a downloadable software application that can be installed and run on a computer.

Smartphone User Interface 622*c*—The smartphone user interface 622*c* provides content in a resolution and delivery mechanism available through a downloadable software application to be installed on a smartphone including devices running Apple® iOS, Android OS, or other mobile operating systems.

Tablet User Interface 622*d*—The tablet user interface 622*d* provides content in a resolution and delivery mechanism available through a downloadable software application to be installed on a tablet including devices running Apple® iOS, Android OS, or other mobile operating systems.

Wearable User Interface 622*e*—The wearable user interface 622*e* provides content in a resolution and delivery mechanism available through a downloadable software application to be installed on a wearable device including devices running Apple® Watch OS, Android Wear OS, or other wearable operating systems.

Other User Interface 622*f*—The other user interface 622*f* provides content in a resolution and delivery mechanism available on any other device or system that contains compute and network connectivity. As compute and network connectivity is introduced into more devices of all types, an installed software application can be provided to deliver persistent messaging to these devices or services.

Persistent Messaging Client 632

The persistent messaging client 632 allows a user to create, modify, view, or delete persistent message content in an interaction. It provides a graphical user interface that allows the user to use the services, whether the persistent message content is delivered from another persistent messaging client 632 or from a text client 602. Persistent message content can include textual, vocal, or visual communications and content as well as other interactions that can be supported by the platform.

Translating Text Message to Persistent Message

Figure 7:
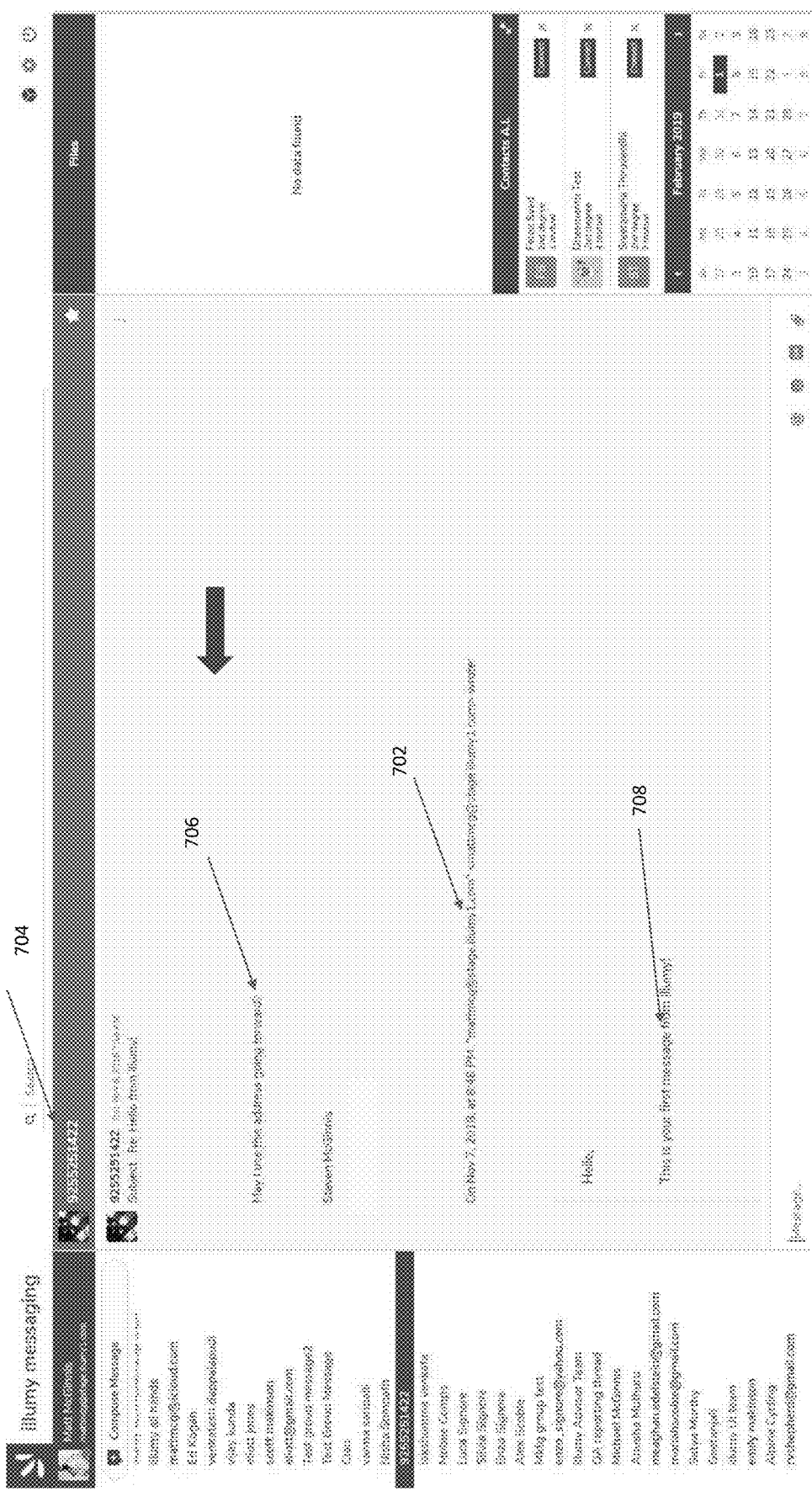
FIG. 7 illustrates an example interface of the platform of FIG. 6 when a text message is received from an off-net user addressed to an on-net user.

FIG. 7 illustrates an example interface of the platform when a text message is received from an off-net user addressed to an on-net user. In this example, an off-net user 704 sends a text message to an on-net user 702. The platform transforms the text message into a persistent message 706, which is visible to the on-net user 702 via the example interface (e.g., as message 706). The on-net user 702 then responds to the text message using the platform (e.g., response 708). The persistent message is transformed to a text message and is delivered to the off-net user 704. In this manner, the back and forth communication between the off-net user 704 and the on-net user 702 can form a series of threaded messages. This thread can be maintained in perpetuity if desired.

Figure 8:
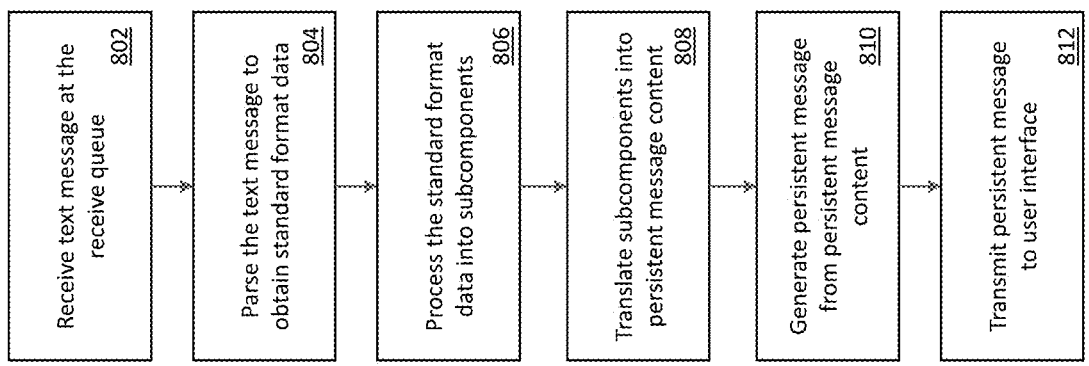
FIG. 8 shows a flowchart illustrating a method of translating a text message from an off-net user to a persistent message.

FIG. 8 shows a flowchart illustrating a method of translating a text message from an off-net user to a persistent message. At 802, a text message that is sent from a text messaging client (e.g., text client 602 in FIG. 6) can be received at the receive queue (e.g., receive queue 606 in FIG. 6). The receive queue collects the text message and ensures message integrity. For example, the receive queue can ensure message integrity based on the SMS, MIMS, or RCS standards for message receipt and acceptance. The text message can then be forwarded to the off-net parsing processor (e.g., off-net parsing processor 610 in FIG. 6).

At 804, the off-net parsing processor parses the text message to obtain text message content. For instance, the off-net parsing processor can parse the text message to obtain the off-net user's phone number, the on-net user's digital identity, the name of the on-net user, text message routing information, the included text message content, and/or the like. The off-net parsing processor also parses the text message content into a standard data format and passes the standard data format to the message router (e.g., message router 612 in FIG. 6). The message router determines the next destination for the standard format data. For example, the message router determines that the standard format data should be transmitted to the message classifier (e.g., message classifier 616 in FIG. 6) and transmits the standard format data to the message classifier.

At 806, the message classifier processes the standard format data into its subcomponents and transmits the subcomponents to the relevant content processing engines (e.g., content processing engine 620 in FIG. 6). At this point, the standard format data can be matched with the history of messages between the off-net user and on-net user to maintain historical context between the two parties. If no prior interaction history exists, a new persistent thread is created.

At 808, the content processing engines translates the standard format data into persistent messaging content be it text, images, video, or any other sort of multi-media. The standard format data can then be transmitted back to the message classifier to store the standard format data in the persistent database (e.g., persistent database 618 in FIG. 6) before transmitting the persistent message content to the message router.

At 810, the message router transmits the persistent message content to the on-net parsing processor (e.g., on-net parsing processor 614 in FIG. 6) which then generates the persistent message. At 812, the persistent message is then delivered to the user interface (e.g., user interface 622) thereby initiating interaction from the persistent messaging client (e.g., persistent messaging client 632 in FIG. 6).

Translating Persistent Message to Text Message

Figure 9:
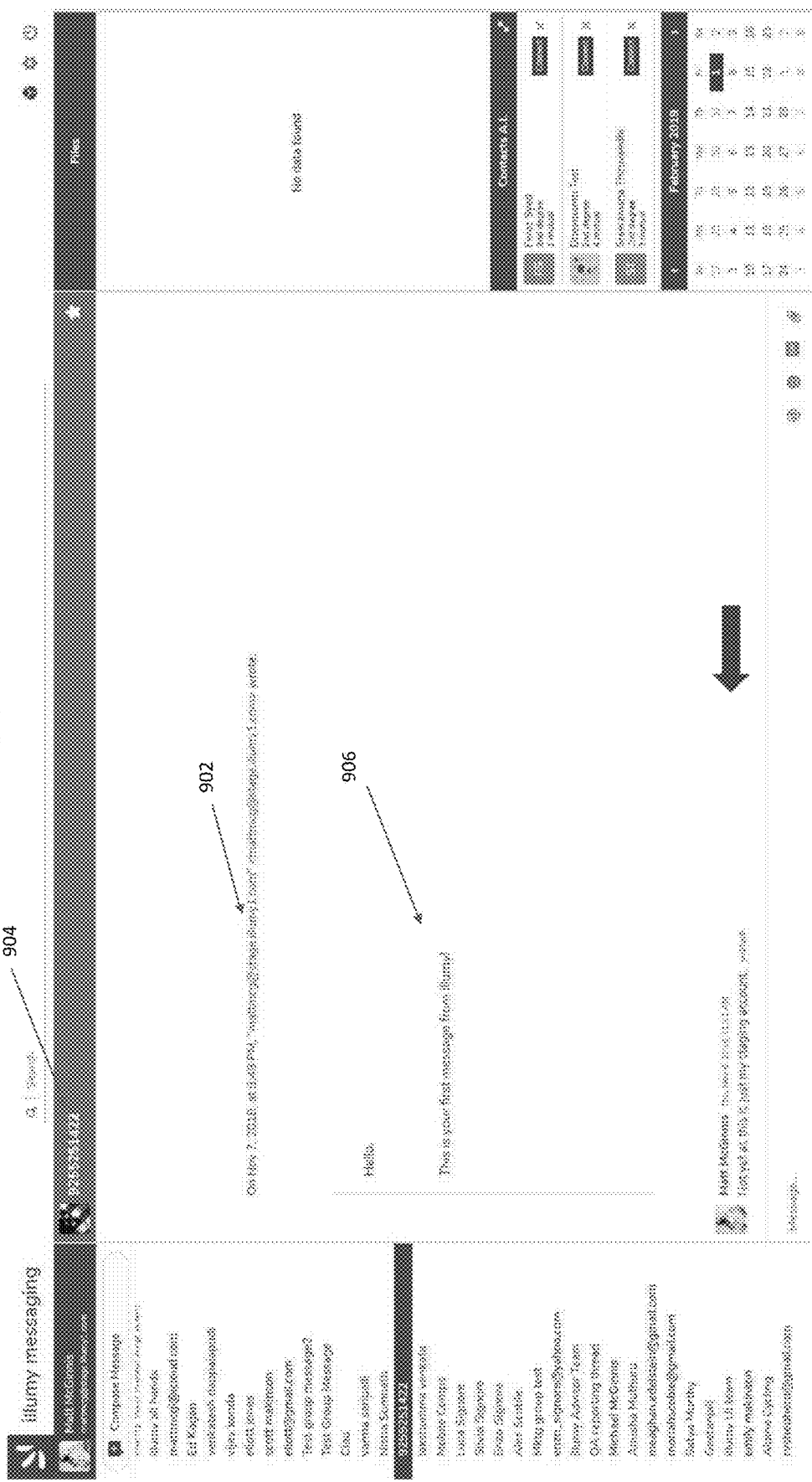
FIG. 9 illustrates an example interface of the platform of FIG. 6 when a persistent message is sent from an on-net user to an off-net text message user.

FIG. 9 illustrates an example interface of the platform when a persistent message is sent from an on-net user to an off-net text messaging user. In this example, an on-net user 902 sends a persistent message 906 via the platform 600 of FIG. 6 to an off-net user 904. The off-net user 904 is using a text client. The persistent message 906 is converted into a text message via the platform 600 and is delivered to the off-net user 904 using the text client. As discussed above, back-and-forth communication between the on-net user 902 and off-net user 904 forms a series of threaded messages. This thread can be maintained in perpetuity if desired.

Figure 10:
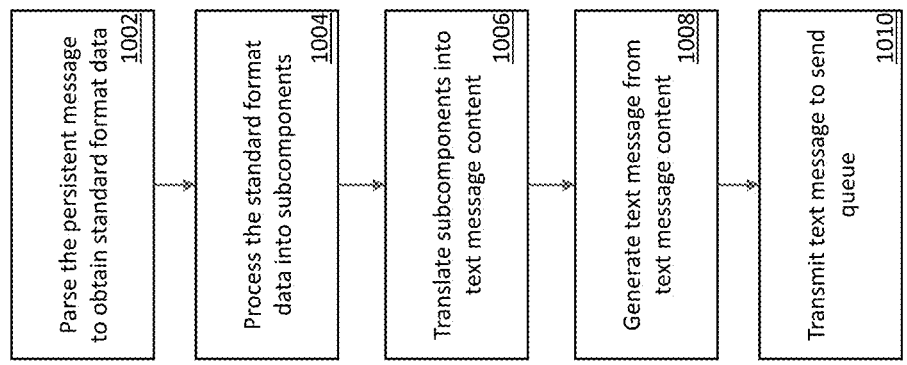
FIG. 10 shows a flowchart illustrating a method of translating a persistent message from an on-net user to a text message.

FIG. 10 shows a flowchart illustrating the method of translating a persistent message from an on-net user to a text message. A persistent message can be sent from a persistent messaging client (e.g., persistent messaging client 632 in FIG. 6) through the persistent messaging user interface (e.g., user interface 622 in FIG. 6). At 1002, an on-net parsing processor (e.g., on-net parsing processor 614 in FIG. 6) collects the persistent message and parses the persistent message into a standard format. The standard format data can be forwarded to a message router (e.g., message router 612 in FIG. 6). The message router receives the standard format data and determines the next destination for where the standard format data should be handled. For example, the message router determines that the standard format data should be transmitted to a message classifier (e.g., message classifier 616 in FIG. 6) and does so.

At 1004, the message classifier processes the standard format data into its subcomponents and transmits the standard format data to relevant content processing engines (e.g., content processing engine 620 in FIG. 6). At this point, the standard format data can be matched with the history of messages between the off-net user and on-net user to maintain historical context between the two parties. If no prior interaction history exists, the message classifier creates a new persistent thread.

At 1006, the content processing engines translate the standard format data into text messaging content be it text, images, video, or any other sort of multi-media. The standard format data can then be transmitted back to the message classifier to store the standard format data in the persistent database (e.g., persistent database 618 in FIG. 6) before transmitting the text messaging content to the message router.

At 1008, the message router transmits the text messaging content to the off-net parsing processor (e.g., off-net parsing processor 610 in FIG. 6) which then generates the text message. At 1010, the text message is transmitted to the send queue (e.g., send queue 608 in FIG. 6), which then sends the text message from the persistent messaging environment to the internet connections. Messages that are addressed to off-net text messaging users can be transmitted from the send queue to the network.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method for translating a text message from a first user using an external text client into a persistent message to a second user using a persistent messaging system, the method comprising:
   receiving, at a receive queue, the text message from the external text client;
   extracting, at an off-net parsing processor, at least one attribute associated with the text message, the attribute comprising identifying information about the first user, identifying information about the second user, and the content of the text message;
   extracting, at the off-net parsing processor, standard format data from the text message, the standard format data including a header and a body, the header comprising metadata defining possible formats of the text message as well as individual or multiple recipients, and the body comprising subcomponents representing the content of the text message;
   determining, at a message router, a next destination for the standard format data based on the at least one attribute, the next destination being at least one of an on-net parsing processor or a message classifier;
   in response to determining that the next destination is the message classifier, matching, at the message classifier, the content of the text message from the standard format data with content of a persistent thread representing an historical interaction between the first user and the second user or users based on the at least one attribute according to artificial intelligence;
   storing the standard format data in a persistent database, the persistent database storing a record of interactions between the first user and the second user on the persistent messaging system;
   processing, at the message classifier, the body of the standard format data into the subcomponents representing content of the text message;
   transmitting, from the message classifier, the subcomponents to respective content processing engines;
   translating, at the respective corresponding content processing engines, the subcomponents into persistent messaging content, the persistent messaging content comprising text, file-related content, and at least one of images, video, or multimedia;
   converting, at the on-net parsing processor, the persistent messaging content to a persistent message; and
   rendering, via a user interface displayed on a device, the persistent message to the second user or users using the persistent messaging system inserted into the persistent thread at the historical interaction between the first user and the second user or users.

2. The method of claim 1, wherein the text message is one of a Short Message Service (SMS) text message, Multimedia Messaging Service (MMS) text message, or Rich Communication Service (RCS) text message.

3. The method of claim 1, wherein the identifying information about the first user includes at least one of a name of the first user or a phone number of the first user and the identifying information about the second user includes at least one of a name of the second user or a phone number of the second user.

4. The method of claim 1, wherein adding the text message to the persistent thread further comprises:

determining, at the message classifier, existence of the historical interaction between the first user and the second user prior to matching the content of the text message from the standard format data with the content of the persistent thread.

5. The method of claim 1, further comprising:
disaggregating the standard format data based on the next destination for the standard format data.

6. The method of claim 1, wherein the persistent message is a first persistent message, the standard format data is first standard format data, and the text message is a first text message, and further comprising:
receiving, via the user interface, a second persistent message from the second user to the first user;
transforming, at the on-net parsing processor, the second persistent message into second standard format data;
determining, at the message router, a next destination for the second standard format data, the next destination being at least one of the off-net parsing processor or the message classifier;
in response to determining that the next destination is the message classifier, processing, at the message classifier, the second standard format data into subcomponents representing content of the second persistent message;
adding, at the message classifier, the second persistent message to the persistent thread based on the historical interaction between the first user and the second user;
transmitting, from the message classifier, the plurality of subcomponents to the respective content processing engines;
translating, at the respective corresponding content processing engines, the plurality of subcomponents to text message content;
converting, at the off-net parsing processor, the text message content to a second text message in a format compatible with the external text client; and
transmitting, via a send queue, the second text message to the first user via the external text client.

7. The method of claim 6, wherein adding the second persistent message to the persistent thread further includes:
matching, at the message classifier, the second standard format data from the persistent message with the historical interaction between the first user and the second user based on at least one of the identifying information about the first user and the identifying information about the second user.

8. The method of claim 7, wherein the identifying information about the first user comprises a phone number of the first user and the identifying information about the second user comprises a phone number of the second user.

9. The method of claim 7, wherein adding the second persistent message to the persistent thread further comprises:
determining, at the message classifier, an existence of the historical interaction between the first user and the second user prior to adding the second persistent message to the persistent thread.

10. The method of claim 6, further comprising:
adding the content in the second persistent message to the persistent database.

11. The method of claim 6, further comprising:
disaggregating the second standard format data based on the next destination for the second standard format data.

12. A persistent messaging system for translating a text message from a first user using an external text client into a persistent message to a second user or users, the persistent system comprising:

an off-net parsing processor to extract at least one attribute associated with the text message and standard format data from the text message, the at least one attribute comprising identifying information about the first user, identifying information about the second user, and content of the text message, the standard format data including a header and a body, the header comprising metadata defining possible formats of the text message as well as individual or multiple recipients, and the body comprising subcomponents representing the content of the text message;
a message router, communicatively coupled to the message router, to determine a destination for the standard format data based on the at least one attribute;
a message classifier, communicatively coupled to the message router, to match the content of the text message from the standard format data with content of a persistent thread representing an historical interaction between the first user and the second user or users based on the at least one attribute according to artificial intelligence, to process the standard format data into subcomponents that represent content of the text message, to add the text message to a persistent thread based on an historical interaction between the first user and the second user, to transmit the subcomponents to content processing engines that translate the subcomponents into the persistent messaging content, the persistent messaging content comprising text, file-related content, and at least one of images, video, or multimedia, and to store the standard format data in a persistent database, the persistent database storing a record of interactions between the first user and the second user on the persistent messaging system;
an on-net parsing processor, communicatively coupled to the message router, to convert the persistent messaging content into the persistent message; and
a user interface, communicatively coupled to the on-net parsing processor, to render, on a display of a device, the persistent message to the second user inserted into the persistent thread at the historical interaction between the first user and the second user or users.

13. The persistent messaging system of claim 12, wherein the text message is one of a Short Message Service (SMS) text message, Multimedia Messaging Service (MMS) text message, or Rich Communication Service (RCS) text message.

14. The persistent messaging system of claim 12, wherein the identifying information about the first user includes at least one of a name of the first user or a phone number of the first user and the identifying information about the second user includes at least one of a name of the second user or a phone number of the second user.

15. The persistent messaging system of claim 12, wherein the message classifier is further configured to determine an existence of the historical interaction between the first user and the second user prior to matching the content of the text message from the standard format data with the content of the persistent thread.

16. The persistent messaging system of claim 12, further comprising:
the persistent database.

17. The persistent messaging system of claim 12, wherein:
the persistent message is a first persistent message;
the standard format data is first standard format data;
the user interface is configured to receive a second persistent message from the second user;

the on-net parsing processor is configured to transform the second persistent message into second standard format data;

the message router is configured to determine a next destination for the second standard format data;

the message classifier is configured to add the second persistent message to the persistent thread based on the historical interaction between the first user and the second user, to process the second standard format data into subcomponents representing content of the second persistent message, and to transmit the subcomponents of the second persistent message to the content processing engines;

the content processing engines are configured to translate the subcomponents of the second persistent message into text message content;

the off-net parsing processing is configured to convert the text message content to a second text message in a format compatible with the external text client; and further comprising:

a send queue, communicatively coupled to the off-net parsing processor, to transmit the second text message to the first user via the external text client.

18. The persistent messaging system of claim 17, wherein the message classifier is further configured to match the second standard format data from the second persistent message with the historical interaction between the first user and the second user based on at least one of the identifying information about the first user and the identifying information about the second user.

19. The persistent messaging system of claim 18, wherein the identifying information about the first user comprises a phone number of the first user and the identifying information about the second user comprises a phone number of the second user.

20. The persistent messaging system of claim 18, wherein the message classifier is further configured to determine an existence of the historical interaction between the first user and the second user prior to adding the second persistent message to the persistent thread.

\* \* \* \* \*